No. 866,926. PATENTED SEPT. 24, 1907.
A. J. FIPPARD.
HYDRAULIC CLUTCH.
APPLICATION FILED MAR. 18, 1907.
2 SHEETS—SHEET 1.
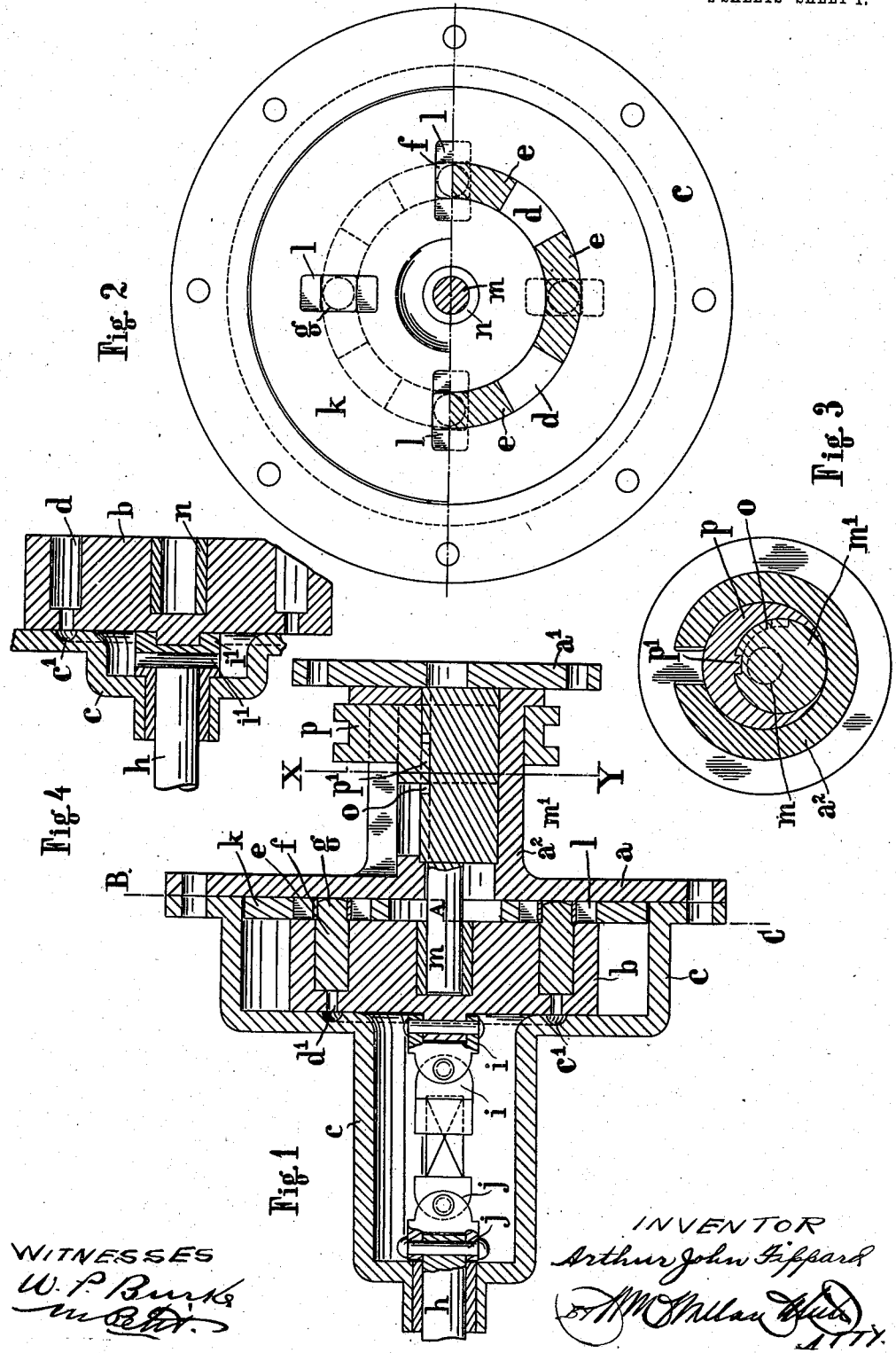
WITNESSES
INVENTOR
Arthur John Fippard
ATTY.

No. 866,926. PATENTED SEPT. 24, 1907.
A. J. FIPPARD.
HYDRAULIC CLUTCH.
APPLICATION FILED MAR. 18, 1907.
2 SHEETS—SHEET 2.
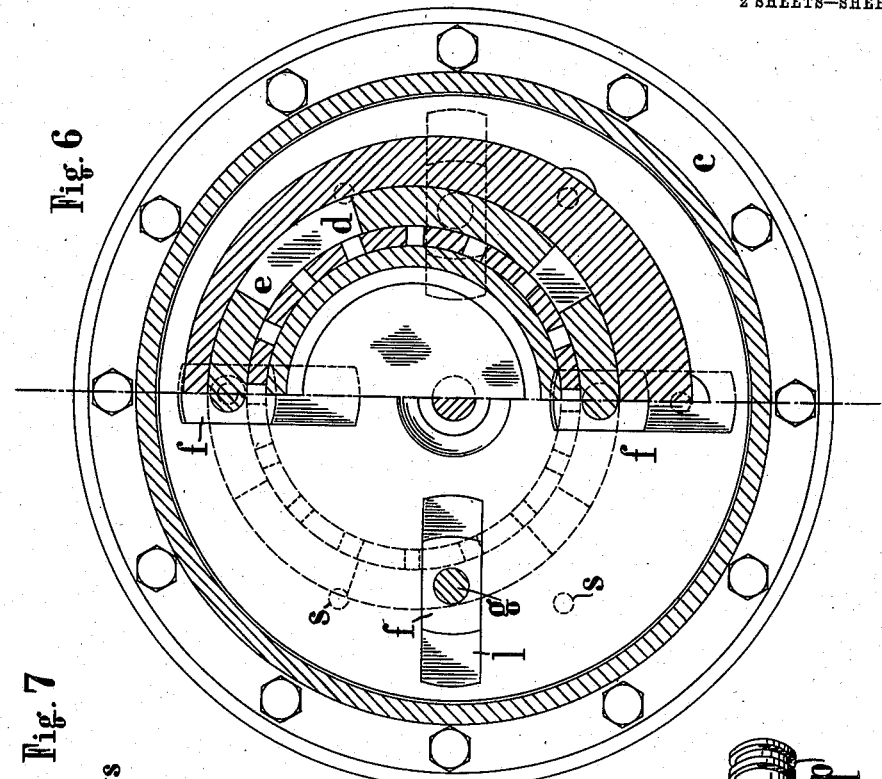
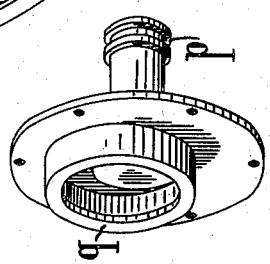
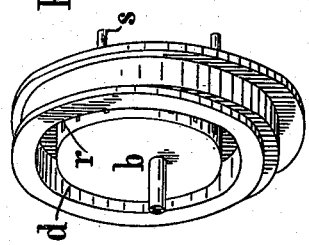
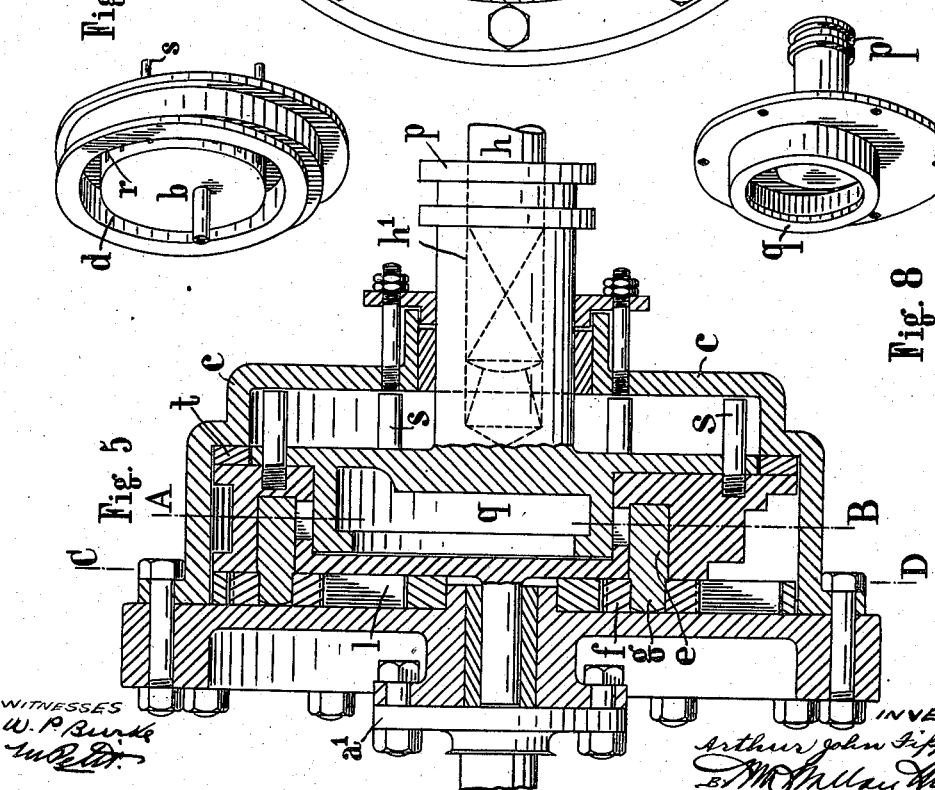

UNITED STATES PATENT OFFICE.

ARTHUR JOHN FIPPARD, OF LONDON, ENGLAND.

HYDRAULIC CLUTCH.

No. 866,926.           Specification of Letters Patent.           Patented Sept. 24, 1907.

Application filed March 18, 1907. Serial No. 363,043.

*To all whom it may concern:*

Be it known that I, ARTHUR JOHN FIPPARD, electrical engineer, a subject of the King of England, and residing at 39 Victoria street, Westminster, London, England, have invented certain new and useful Improvements in Hydraulic Clutches, of which the following is a full, clear, and exact description and for which I have applied for Letters Patent in Great Britain, dated April 19, 1906, No. 9,236 of 1906.

This invention relates to improvements in hydraulic clutches and is particularly designed for use upon automobile vehicles but can also be employed for connecting and disconnecting machinery and for other similar purposes.

The two portions of the clutch forming the driver and the follower members are provided with an annular groove or annular chamber in which blocks, segments or the like are arranged, these segments closely fitting the groove as to width and depth and being arranged with spaces between one another; the recess is provided in one member of the clutch and the blocks or segments are fitted in or connected to the other member. The annular chamber is afforded by a recessed device which can be rendered eccentric to the centers of the driver and follower; these two parts of the clutch may be formed as plates or disks of any suitable section and they are arranged to form an oiltight casing. Pins or pivots are fitted to the segments and engage with slots or grooves in one of the plates or disks. These slots may be of any desired shape and be set at such angles or positions as may be found convenient. The blocks rotate with the plate or disk to which they are fitted and in doing so they travel circumferentially around the annular recess or chamber unless locked in it by oil or other suitable fluid in the manner hereinafter described. The plates or disks are mounted on axles having common centers with means for altering the centers to cause the device affording the annular chamber to assume a position in which the said chamber is eccentric to said centers. The power is thus transmitted through the clutch by the compression of liquid between segments in the eccentric groove within which the said segments have a pulsating movement by reason of their being constrained to move along radial paths.

The invention is exemplified upon the accompanying drawings in which:—

Figure 1 is a sectional side elevation of the clutch. Fig. 2 is a front elevation part section, of the same; the upper half is a section on line A B and the lower half on line A C of Fig. 1. Fig. 3 is a sectional elevation on line X—Y of Fig. 1. Fig. 4 is a part section similar to Fig. 1 of an Oldham coupling in place of the universal joint in Fig. 1. Fig. 5 is a sectional side elevation of a modified form of the clutch. Fig. 6 is a front elevation, part section of the form illustrated in Fig. 5; the right half is a section on line A—B and the left a section on line C—D of Fig. 5. Fig. 7 is a perspective view of the follower member detached, and on a smaller scale. Fig. 8 is a perspective view of the plunger valve.

As shown in Fig. 1, the improved fluid clutch comprises two members the driver $a$ and the follower $b$. The driver $a$ is coupled direct to the engine or other source of power or to its gearing by means of the flange $a'$, and has a casing $c$ of any suitable construction bolted to it. The follower $b$ is free to rotate inside the case $c$.

The follower $b$ has an annular groove $d$ cut in it and in this chamber are fitted three, four or any suitable number of segments $e$, said segments having fitted to them heads or slippers $f$, which can freely turn upon the pins $g$ formed on the segments. This annular groove $d$ forms a chamber for liquid and a race for the segments $e$. Oil or other suitable liquid is placed in the chamber $d$ to fill it completely. The follower member $b$ is connected to the secondary shaft $h$, which in turn may be coupled to the road wheels, or to other machines, wheels or their gear by means of universal joints $i$ $j$ or similar means of any suitable construction and by this provision of universal joints the member $b$ can move in any direction within the casing $c$. The driver member $a$ has a disk $k$ provided with radial, tangential or other slots $l$ of any desired shape. The slippers $f$ engage in the slots $l$ thus causing the segments $e$ to turn or run in the race $d$ when the member $a$ is in motion and the engine is running free. These members $a$ and $b$ revolve on axles having the same common center when in the free position, but are provided with suitable means whereby the centers can be varied. In the example shown in Fig. 1, a pin $m$ formed eccentrically upon a shaft $m'$ fits loosely within a bush $n$ arranged in the center of the member $b$, the other part $m'$ being eccentric to that member. A single thread or spiral $o$ is cut partly round the shaft $m'$ in which fits a single tooth or key $p'$ on the collar $p$ which is free to move along the arm $a^2$ of the member $a$. If the collar $p$ is thus moved by means of, for instance, a lever or striking fork towards the member $a$ in the direction shown by the arrow, the tooth $p'$ slides along the spiral $o$ and so rotates the shaft $m'$ within the collar $p$, thus causing the pin $m$ to turn out of its normal center and become eccentric to it. By this movement of the pin $m$ the member $b$ is displaced and also becomes eccentric to its normal axis, thus causing the slots $l$ in the member $a$ to act on the slippers $f$ of segments $e$ in the member $b$ in such a way as to vary the spaces between them. While the member $b$ was in its normal position, the segments $e$ were disposed at equal intervals around the groove and preserved this regular spacing in their travel. The movement of the member $b$ to an eccentric position, however, causes the segments to crowd together towards one point in the circumference, while moving apart towards the opposite point. As they travel round the race $d$ the spacing varies between these two extreme values. This variation or pulsation produces pressure on part of the liquid between the segments $e$ and thus a grip or hold is produced between the two members or disks $a$ and $b$ and the one is then capable of driving the other.

The groove or race $d$ has holes or openings $d'$ which when the members are concentric, coincide with a circular channel $c'$ cut in the case $c$ (shown only in Figs. 1 and 4) so that oil can intercommunicate in the spaces between the segments. When the member $b$ is moved eccentrically the holes $d'$ leave the channel $c'$ to a sufficient extent first to throttle the oil at the holes $d'$ and then entirely to shut it off and so create the grip or clutching action.

In the modification shown in Figs. 5 to 8 the clutch is again provided with the annular groove or chamber $d$ arranged eccentric to the center of the axles.

The member $b$ has the chamber or race $d$ cut in it within which recess a number, say four, of segments $e$ are arranged at a distance from each other, and in such a manner that they occupy the full width and depth of the recess $d$ but are able to travel round in it. The fluid is placed in this recess or chamber and preferably occupies all available space within the casing $c$. The segments $e$ $e$ having pins $g$ and slippers $f$ as before fit within slots $l$ in the disk $k$, thus causing the segments $e$ to travel in the groove or race $d$ when the engine is running free. The shaft $h$ with square end $h'$ has a sliding collar $p$ which operates a valve $q$ of preferably circular shape. This valve works backwards and forwards on the guide pins $s$ inside the member $b$ and over the port or openings $r$ in the member $b$. These ports $r$ extend from the annular chamber $d$ to the interior of, or hollow chamber within the member $b$.

The two members $a$ $b$ have centers in common, and assuming the valve to have closed the ports $r$ (as shown in Fig. 5) and the member $a$ to be running, the slots $l$ cause the segments to travel in the recess or race $d$, varying the spaces between them owing to the eccentricity of the groove $d$ in the member $b$.

It will be obvious that when the oil is locked between the segments, this variation cannot take place and thus a grip or hold is produced between the members $a$ and $b$ and the one is then capable of driving the other. If however the valve $q$ is withdrawn by means of the collar $p$ so as to uncover the port $r$, the segments $e$ can force the oil out and in through the ports, according to the movements of the segments in relation to each other. The liquid being then free to pass through the ports $r$ the clutch is free to slip to an extent dependent on the extent to which the ports $r$ are uncovered. The valve can be operated so that this escaping or freeing of the oil can be adjusted entirely to free one member from the other or to do so only partially, thus obtaining any desired slip between the two members.

Inside the casing $c$ a metal ring $t$ is fitted to take up the strain and wear from the member $b$, as the two members, when they are locked, tend to force one another apart.

The casing may be filled and emptied of its oil or other liquid by means of any suitable pipes and cocks or screw threaded plugs.

Instead of the universal joint $i$ $i$ shown in Fig. 1, an Oldham coupling $i'$ $i'$ may be used between the follower member $b$ and its shaft $h$, as shown in Fig. 4.

In this invention, as shown in the accompanying drawings, either member is capable of driving the other in both directions of rotation. It is to be understood that the improved clutch can be made in various different shapes and sizes, and that the members can be of any suitable section; one member has a recess or groove and the other has means for carrying the blocks or segments.

Having thus described my invention, what I claim as such and desire to secure by Letters Patent is:—

1. A hydraulic clutch comprising driver and follower members, an annular recess in one of said members, blocks fitting said recess and connected to the other member, means for causing relative motion of said blocks within said recess, and means for causing a variable resistance to said relative motion.

2. A hydraulic clutch comprising a driver member, said member having a disk fitted with slots, a follower member including a piece recessed annularly, blocks fitting said annular recess and having pins whereon are mounted slippers which extend into said disk slots and liquid circulated by said blocks.

3. A hydraulic clutch comprising a driver member, a casing secured to said driver, a slotted disk arranged within said casing and secured to said driver, a follower member also arranged within said casing, an annular chamber in said follower member, blocks fitting said annular chamber and adapted to travel circumferentially therein and extensions from said blocks passing into said slots so as to be controlled by said slots, and liquid circulated by said blocks.

4. A hydraulic clutch comprising a casing, a driver member secured to said casing, a disk located within said casing and having slots formed therein, a follower member having an annular chamber arranged therein, blocks adapted to fit and travel around said annular chamber, pivots upon said blocks and slippers on said pivots, said slippers arranged to travel in said slots and liquid circulated by said blocks.

5. A hydraulic clutch comprising a driver member having a casing and a slotted disk, said casing and disk revoluble with said driver, a follower member arranged within said casing and having a shaft passing out through said casing, a coupling between said follower and its shaft, an annular groove in said follower, blocks fitting said annular groove and adapted to travel therein, liquid in said groove between said blocks, and extensions from said blocks into the slots of said disk.

6. A hydraulic clutch comprising a driver having a closed casing and a slotted disk, a follower member arranged in said casing, an annular groove forming a chamber for liquid in said follower, blocks fitting said chamber and adapted to travel around said annular chamber, extensions from said blocks into said slots and liquid circulated by said blocks.

7. A hydraulic clutch comprising a driver having a slotted controlling disk, a follower member facing said disk, an annular groove forming a chamber for liquid in said follower, blocks fitting said chamber, extensions from said blocks engaging with said slots and means for varying the amount of slip between the driver and the follower.

8. A hydraulic clutch comprising a driven member having a closed casing and a slotted disk, a follower member arranged in said casing, an annular groove forming a chamber for liquid in said follower said follower bearing against said casing means for interconnecting to a variable extent various points in the circumference of said groove, blocks fitting said annular chamber, extensions from said blocks engaging with said slots in the driver disk.

9. A hydraulic clutch comprising a driver member having a drum like casing and a slotted disk, a follower member arranged in said casing, a coupling between said follower and a shaft passing out through said casing, an annular groove forming a chamber for liquid in said follower, said follower being held against said casing, means for interconnecting to a variable extent various points in the circumference of said groove, blocks fitting said annular chamber, and extensions from said blocks engaging with said slots in the driver disk.

10. In a hydraulic clutch, the combination of a driver member having a slotted disk with a follower member having an annular chamber, blocks fitting said annular chamber and adapted to travel therein, extensions from said blocks into said slots, and liquid circulated by said blocks.

11. An improved hydraulic clutch containing within a casing a driving and driven member, mounted on separate shafts, an eccentrically arranged groove in one of the members, blocks connected to the other member and designed to travel in the said groove, liquid in said groove, and means for releasing the liquid when required.

12. A hydraulic clutch, comprising a driver member having a casing and a slotted plate, a follower member having an annular groove arranged therein, blocks fitting said annular groove and adapted to travel therein, extensions from said blocks into said slots of the driver plate, a central chamber in said follower, ports between said annular groove and said central chamber, and a valve adapted to control said ports.

13. A hydraulic clutch, comprising a driver member having a casing and a slotted disk, a follower member having an annular groove formed therein, blocks fitting said groove, extensions from said blocks and slippers upon said extensions, said slippers engaging in the radial slots of said driver disk, a hollow chamber within said follower ports connecting said hollow chamber with said annular groove, liquid in said chamber and groove and a plunger valve adapted to control the passage of the liquid through the ports, the annular groove in said follower being eccentric to the axis of said follower shaft.

14. A hydraulic clutch comprising a driver member having a casing and a slotted disk, a follower member having an annular groove formed therein, said groove being eccentric to said driver member, blocks fitting said groove, extensions from said blocks and slippers revoluble upon said extensions, said slippers engaging in the slots of the driver disk, a chamber for liquid within the follower, ports between said chamber and the annular groove, and a valve movable within said chamber and over the ports so as to control the passage of liquid through the ports.

15. A hydraulic clutch comprising a driver member having a casing and a slotted disk, a follower member having an annular groove formed therein, said groove being eccentric to said driver member, blocks fitting said groove, pivots from said blocks and slippers on said pivots, said slippers being engaged in the slots of said driver disk, a chamber for liquid in said follower, passages between said chamber and said annular groove, and a displaceable plunger valve guided in said chamber and adapted to cover and control said passages.

16. In a hydraulic clutch, the combination of a driver member having a slotted disk, of a follower member having an annular groove and an internal chamber for liquid, said groove being eccentric to said driver member, said groove and chamber communicating by ports, of a plunger fitting said chamber and adapted to cover said ports, and of blocks fitting said annular groove and traveling therein, said blocks having extensions into the slots of said driver disk.

17. In a hydraulic clutch, the combination of a driver member having a slotted disk, of a follower member having an annular groove and an internal chamber for liquid, said groove being eccentric to said driver member said groove and chamber communicating by ports, of a plunger fitting said chamber and adapted to cover said ports, parallel guide pins extending outwardly from said follower, a flange from said plunger and holes in said flange to engage said guide pins, and of blocks fitting said annular groove and traveling therein, said blocks having extensions into the slots of said driver disk.

18. A hydraulic clutch, comprising a driver member having a casing and a slotted disk, a follower member having an annular groove formed therein, a wearing ring within said casing and against which said follower member bears, said groove being eccentric to said driver member, blocks fitting said groove, pivots from said blocks and slippers on said pivots, said slippers being engaged in the slots of said driver disk, a chamber for liquid in said follower, passages between said chamber and said annular groove, and a displaceable plunger valve guided in said chamber and adapted to cover and control said passages.

19. A hydraulic clutch comprising a driver member having a casing and a slotted disk, a follower member having an annular groove formed therein, said groove eccentric to said driver member, blocks fitting said groove, pivots from said blocks and slippers on said pivots, said slippers being engaged in the slots of said driver disk, a chamber for liquid in said follower, passages between said chamber and said annular groove, a displaceable plunger valve guided in said chamber and adapted to cover and control said passages, and guides for said plunger externally of said follower.

20. A hydraulic clutch, comprising a driver member having a casing and a slotted disk, a wearing ring within said casing opposite to said slotted disk, a follower member having an annular groove formed therein, said annular groove being eccentric to the driver member blocks fitting said groove, projections from said blocks extending into said slots in the driver disk, an internal chamber within the follower for liquid, ports between said chamber and said annular groove, and a valve fitting said chamber and adapted to cover and uncover said slots, said valve being provided with external guides, and means for displacing said valve.

21. A hydraulic clutch comprising a driver member having a disk provided with slots, a follower member including a device recessed to form an annular chamber, blocks fitting said annular chamber and guided by said slots in said driver disk, and liquid circulated by said blocks.

22. A hydraulic clutch comprising a driver member having a disk provided with slots, a follower member including a device recessed to form an annular chamber, blocks fitting said annular chamber and guided by said slots in said driver disk, and liquid circulated under pressure by said blocks through ports in said annular chamber.

23. A hydraulic clutch comprising a driver member, having a disk provided with slots, a follower member, including a device recessed to form an annular chamber, said chamber being eccentric to said disk, blocks fitting said annular chamber and guided by said slots, and liquid circulated by said blocks.

24. A hydraulic clutch comprising a driver member, having a disk provided with slots, a follower member provided with an annular chamber, blocks fitting said annular chamber and guided by said slots, and liquid circulated by said blocks when said chamber is eccentric to said disk.

25. A hydraulic clutch comprising a driver member and a follower member, an annular chamber in one of said members, a disk having guide slots secured to the other of said members, blocks arranged around said annular chamber extensions from said blocks into said guide slots and liquid in said chamber between said blocks.

In witness whereof I affix my signature in presence of two witnesses.

ARTHUR JOHN FIPPARD.

Witnesses:
VICTOR F. FEENY,
CYRIL J. FEENY.